United States Patent Office 3,302,004
Patented Jan. 31, 1967

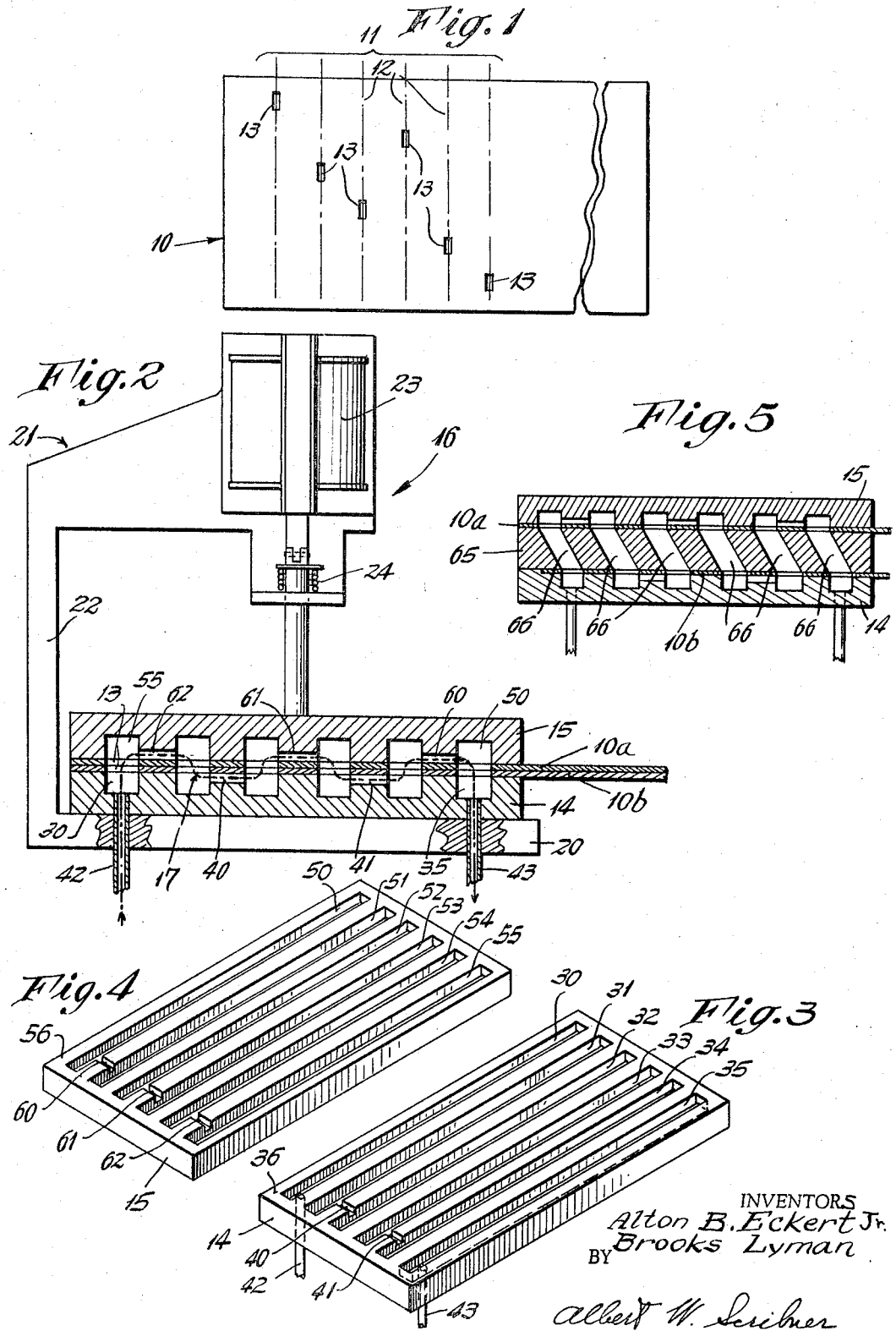

3,302,004
PNEUMATIC RECORD SENSING APPARATUS
AND METHOD
Alton B. Eckert, Jr., Port Chester, and Brooks Lyman, Pound Ridge, N.Y., assignors to Pitney-Bowes, Inc., Stamford, Conn., a corporation of Delaware
Filed Sept. 5, 1962, Ser. No. 221,571
12 Claims. (Cl. 235—61.7)

This invention relates to a novel method and apparatus for sensing perforated records. More particularly the invention relates to a method and apparatus for simultaneously pneumatically sensing two or more perforated records in order to determine the positional coincidence of corresponding perforations in the respective records.

In many business applications it is desirable to check pairs or groups of separate perforated records in order to insure that at least a portion of the respective records have identical perforations or data encoded therein. Several data comparing techniques have been used here, for example apparatus has been proposed whereby the pertinent data on a first record is sensed and stored and the related pertinent data on a second record is subsequently sensed and compared with the stored data of said first record. If the compared data is identical then the cycle is repeated on the next pair of records and so forth. Here if and when the data being compared is not identical then an error signal is initiated to appropriately control the related data processing equipment. Most of the various known devices for comparing perforated records are relatively complex and expensive and have some deficiencies due to the large number of parts and/or to the serially operated nature of the record handling equipment necessarily associated therewith.

One object of the instant invention is to provide a relatively inexpensive pneumatic type record comparator that is simple in construction and reliable in operation.

Another object of the invention is to provide a novel method for comparing a plurality of perforated records whereby the continuity of a fluid stream is dependent on the coincidence of related perforations in the respective records.

Another object of the invention is to provide a novel method and apparatus for simultaneously pneumatically sensing the positional coincidence of the pertinent perforations in a plurality of superimposed records.

Another object of the invention is to provide a novel method and apparatus for comparing the pertinent data in a plurality of perforated records whereby a predetermined verifying fluid circuit is completed only when the pertinent record perforations are identically located in the respective records.

A further object of the invention is to provide a novel pneumatic comparator for perforated record cards which are allegedly identical whereby a plurality of said cards are pressure sealed between channelled members that are constructed so as to afford a tortuous but continuous predetermined air flow path only when the various corresponding perforations in said cards respectively positionally register with said predetermined flow path.

Other objects and advantages will become apparent as the description proceeds.

In the drawings:

FIG. 1 is a fragmentary plan view of a perforated record card to be sensed;

FIG. 2 is an elevational view in partial section and shows the operative condition of the instant pneumatic comparator;

FIGS. 3 and 4 are perspective views of the lower and upper comparator blocks or blades respectively and illustrate the nature of and the positional relationship between the various grooves formed in the operative faces of said plates;

FIG. 5 is en elevational view in section illustrating a second embodiment of the invention wherein a spacing block is used between the records being compared.

A general description of the method used in comparing a plurality of perforated records will be made first in connection with FIGS. 1 and 2. FIG. 1 illustrates a typical record card 10 having a zone 11 in which are located the perforations representative of the data to be compared. Zone 11 may be defined by any desired number of columns such as 12 in each of which is located one and only one perforation such as 13; each such perforation having a particular position in its column as is well understood in the art. When it is desired to compare a plurality of record cards that allegedly have the same disposition of perforations in a particular zone such as 11 the cards are placed in mutually superimposed and registered relation and are located between a grooved plate or block 14 and a cooperating movable grooved plate or block 15 of the instant comparator 16 as illustrated in FIG. 2. The two cards 10a and 10b, which will be assumed to be the record cards to be compared in this illustrative situation, are then pressed together in pneumatically sealed relation by the clamping action of the blocks. Blocks 14 and 15 are grooved, as will be more fully described below, in such a manner as to afford a continuous air flow path or conduit when the perforations in the sensed record cards match. When this operative condition exists as is illustrated in FIG. 2 an air stream such as designated by dotted line 17, may be passed through the comparator so as to verify the identical locations of the perforations in the two cards 10a and 10b. The presence or absence of this air stream may be detected by any suitable well known means. As will be apparent, if any perforation in one of the record cards is not positionally coincident with a perforation in the corresponding column of an adjacent card then the said air flow path is blocked by the unperforated portion of said adjacent card and hence there will be no verifying air stream emanating from the exhaust port of the comparator. Thus any set of superimposed record cards that will permit air flow through the comparator will of necessity all be perforated identically in the compared zones; and any such group of cards which do not permit such an air flow will of necessity not all be perforated alike. If desired the presence or absence of this verifying air flow may be used to operate the control means of an associated portion of related data processing equipment.

Referring to FIGS. 2–4 a more specific description will be made of the construction and arrangement of the channelled blocks or plates 14 and 15. The lower block 14 is mounted on a base portion 20 of a frame 21 that has an upstanding portion 22 which supports a pusher type solenoid 23 that is operatively connected to the upper block 15. The block 15 is normally biased away from block 14 by suitable spring means 24 and is movable into clamping engagement with the lower block in response to the energization of solenoid 23. The opposed faces of the blocks 14 and 15 are grooved in such a way that when the blocks are placed in mutual engagement a single continuous tortuous air flow path is established through said blocks. Referring to FIG. 3 the lower block 14 has a plurality of parallel grooves 30–35 formed in the operative face 36 thereof. The pairs of successive grooves 31, 32; and 33, 34 are respectively pneumatically connected by transverse channels 40 and 41. The effective length and spacing of the parallel grooves correspond to the length and spacing of the columns 12, FIG. 1, in the record cards to be used with the instant comparator. An air inlet channel 42 communicates with the first groove 30 and an air outlet channel 43 communicates with the last groove 35. The upper block 15, FIG. 4, has a plurality of parallel grooves 50–55 formed in the operative face 56 thereof, these grooves respectively corresponding in length and spacing with said grooves 30–35. Here, however, the pairs of successive grooves 50, 51; 52, 53 and 54, 55 are respectively pneumatically connected by transverse channels 60, 61 and 62. As may be seen from FIG. 2 when the two blocks 14 and 15 are operatively placed together a single continuous tortuous fluid flow path or conduit is established as indicated by said dotted line 17. The number of grooves in each block is the same as the number of columns in the card zone to be checked.

When it is desired to compare say the two allegedly similar perforated record cards 10a and 10b which have one and only one perforation in each column such as 12 these cards are placed in mutually registered and superimposed relation and the zones, such as 11, to be compared are placed over said operative block face 36 so that the pertinent perforate columns such as 12 are in registry with the grooves 35–35. Thereafter the solenoid 23 is energized to move the block 15 down into clamping engagement with the registered and positioned record cards on said lower block, the grooves 50–55 registering with the said columns such as 12 of the record cards. In this condition of the parts the planes of the record cards serially intersect successive points along the length of the air flow path 17. It will be seen that when an air flow is initiated in the inlet channel 42 this flow may continue along said path if for each perforation in each column in card 10a there is a corresponding registering perforation in each column in card 10b. When all card perforations in the pertinent zone match then air may flow along the complete length of said path and finally out through the exhaust channel 43. If for any particular perforation in card 10a there is no corresponding perforation in the card 10b, or vice versa, then the air flow path will be blocked and no output air flow signal will flow through exhaust channel 43. The presence or absence of an output flow of air through channel 43 may be detected by any suitable means such as a hot wire anemometer and if desired the output from this detecting means may be used to control the operation of any associated data processing apparatus.

The instant record sensing device may be used in combination with a suitable record card transport mechanism that may be programmed to perform different types of operations. For example, a group checking operation may be performed wherein a given stack of perforated records are all simultaneously compared for perforation coincidence. A hunting operation may be performed by having one master record card remain between the blocks while a plurality of cards are serially fed and compared with the master card until a match occurs. Yet another application is where individual cards are sensed to check for the presence of a perforation in each of the pertinent columns. If the records to be sensed have more than one perforation in each column such as 12 then the instant device may be used to insure that at least one perforation in one record corresponds to a perforation in the other or another record.

FIG. 5 shows an alternative embodiment for the instant comparator, this embodiment being substantially the same as that described in connection with FIGS. 1–4 except that the record cards 10a and 10b are operatively separated by a plate 65 which is formed with individual mutually spaced transverse holes or channels 66. Each of the channels 66 registers with only one of all the possible positions for a perforation of the pertinent card zone 11 of both of the cards 10a and 10b. Here the record cards 10a and 10b do not have to be placed in mutually registered contacting superimposed relation but rather may be spaced apart in variable relative positions while having their corresponding perforations communicating with one another along the portions of the air flow path defined by said channels 66.

As will be apparent the instant pneumatic device is relatively simple, inexpensive and rugged in construction and has only a very few moving parts whereby the production costs are minimal and the reliability factor is relatively high.

Since many changes could be made in the embodiments of the invention as particularly described and shown herein without departing from the scope of the invention, it is intended that this embodiment be considered as exemplary and that the invention not be limited except as warranted by the following claims.

What is claimed is:

1. A method of comparing a plurality of perforated elements comprising the steps of placing the corresponding perforatable regions of said elements in predetermined fluid communicatable relation;

establishing a continuous fluid flow path which can serially intersect several of the said regions of each of said perforated elements;

locating said elements so that said fluid path serially intersects several of the said regions of said perforated elements;

initiating a fluid flow along said path, and detecting the presence or absence of fluid flow through the entire length of said path thereby to determine the similarity or non-similarity in the locations of the perforations in said element regions.

2. A method of comparing a plurality of perforated elements comprising the steps of establishing individual fluid communications between each of the respective regions of said elements where corresponding perforations may exist;

establishing a continuous predetermined fluid flow path which includes some of said communications and which can successively intersect each of said perforated elements at a plurality of said regions, locating said elements so that said fluid path serially intersects several of the said regions of said perforated elements;

initiating a fluid flow along said path, and detecting the presence or absence of fluid flow through said path thereby to determine the similarity or non-similarity of the respective perforation locations in said elements.

3. A method of comparing a plurality of perforated record cards; comprising the steps of placing corresponding predetermined regions of said cards in mutually registered and communicating relation, establishing a continuous predetermined fluid flow path which intersects the registered regions at successive locations in each card where perforations may be located, locating said record cards so that said fluid flow path serially intersects said successive locations of said perforated records cards;

initiating a fluid flow along said path, and detecting the presence or absence of fluid flow through the entire length of said path thereby to determine the similarity or non-similarity of the locations of perforations in said card regions.

4. Apparatus for comparing perforated records comprising:

means for supporting a plurality of perforated records in predetermined mutual positional relation, said supporting means serving to give any perforations in a first one of said records fluid access to any respectively corresponding perforations in a second one of said records, said supporting means including a first conduit means defining a fluid flow path from a first perforation in said first one of said records to a second perforation in said first one of said records, and a second conduit means defining a fluid flow path from a first perforation in said second one of said records to a second perforation in said second one of said records whereby when said first and second conduit means cooperatively register with said record perforations respectively the serial continuity of said paths is dependent on the correspondency of the locations of said second perforation in said first one of said records and said first perforation in said second one of said records.

5. Apparatus for comparing perforated records comprising:
   means for supporting said perforated records in predetermined mutual positional relation, said supporting means serving to give any perforations in a first one of said records fluid access to any respectively corresponding perforations in a second one of said records,
   a first conduit means defining a fluid flow path to a first perforation in said first one of said records, and
   a second conduit means defining a fluid flow path between a perforation in said second one of said records corresponding to said first perforation and a second perforation in said second one of said records whereby fluid may flow serially along said paths when said perforations are located in corresponding positions in said perforated records.

6. Apparatus for sensing perforated records; comprising
   a frame,
   a first conduit means mounted on said frame,
   a second conduit means mounted on said frame and cooperable with said first conduit means,
   said conduit means being formed so as to cooperatively and serially form one continuous operative fluid flow path, and
   means for receiving and supporting perforated records in positions to intersect said path whereby the continuity of fluid flow through said path at a plurality of points is dependent upon the locations of the corresponding of the respective perforations in said records.

7. Apparatus for comparing perforated records; comprising means for supporting a plurality of perforated records in predetermined mutually registered relation, said supporting means being arranged to afford any perforations in a first one of said records pneumatic access to the respectively corresponding perforations in a second one of said records,
   conduit means defining an air flow path to a first perforation in said first one of said records,
   conduit means defining an air flow path between the perforation in said second one of said records corresponding to said first perforation and a second perforation in said second one of said records, and
   conduit means defining an air flow path between the perforation in said first one of said records corresponding to said second perforation and another perforation in said first one of said records whereby the serial continuity of an air flow along said flow paths is dependent on the correspondency of the respective perforations in said records, 8. A comparator for perforated records; comprising an upper channelled block,
   a lower channelled block, said channelled blocks being adapted to cooperatively form a continuous fluid flow path through said blocks, and
   means associated with said blocks for receiving and supporting a plurality of perforated record cards so that the respective corresponding record perforations may register at successive points along said path whereby the continuity of fluid flow along said path is controlled by the coincidence of said corresponding record perforations.

9. A pneumatic record sensing device; comprising
   a first block having a plurality of channels formed therein,
   means for pneumatically connecting pairs of successive channels in said first block,
   a second block having a plurality of channels formed therein,
   means for pneumatically connecting pairs of successive channels in said second block, the channels in said blocks being effective when said blocks are moved to mutually cooperating positions to define a continuous air flow path through said blocks, and
   opposed faces formed on said blocks adapted to clamp a perforated record therebetween so that perforations in said record may serially register with said air flow path whereby the continuity of a verifying air flow through said path is dependent on the presence of at least one record perforation corresponding to each one of said channels formed in said first block.

10. A record sensing device; comprising
    a first block having a plurality of channels formed therein,
    a second block having a plurality of channels formed therein,
    said channels being arranged so that when said blocks are placed in structurally cooperating relation said channels serially define a continuous tortuous fluid flow path, and
    inlet and outlet conduit means connected to said blocks so as to permit fluid flow to and from said flow path.

11. Apparatus as defined by claim 6: additionally comprising
    a third conduit means operatively disposed between and communicating corresponding perforations of said records.

12. Apparatus as defined by claim 10: additionally comprising
    a third block having a plurality of conduits formed therein for communicating the respective corresponding individual regions of said channels in said first and second blocks.

References Cited by the Examiner
UNITED STATES PATENTS
2,027,033   1/1936   Ford _____ 235—61.11

MAYNARD R. WILBUR, Primary Examiner.
J. I. SCHNEIDER, Assistant Examiner.